United States Patent [19]

Sato

[11] 4,127,781
[45] Nov. 28, 1978

[54] SCAN MIRROR POSITION DETERMINING SYSTEM

[75] Inventor: Robert N. Sato, Gardena, Calif.

[73] Assignee: Hughes Aircraft Company, Culver City, Calif.

[21] Appl. No.: 809,149

[22] Filed: Jun. 22, 1977

[51] Int. Cl.² .............................................. G01N 21/32
[52] U.S. Cl. .................................... 250/562; 250/212; 250/230
[58] Field of Search ........... 250/230, 212, 234, 237 G; 357/30

[56] References Cited

U.S. PATENT DOCUMENTS

| | | | |
|---|---|---|---|
| 3,310,439 | 3/1967 | Seney | 250/212 |
| 3,335,367 | 8/1967 | Skooglund et al. | 250/230 |
| 3,364,358 | 1/1968 | Ashworth | 250/230 |
| 3,555,285 | 1/1971 | Irving | 250/230 |
| 3,911,469 | 10/1975 | Wrobel | 357/30 |

Primary Examiner—M. Tokar
Attorney, Agent, or Firm—W. H. MacAllister; Walter J. Adam

[57] ABSTRACT

A scanning mirror position sensor operable from the back side of a scanning mirror which utilizes the front side of the mirror for scanning a scene to be interrogated or displayed. A rectangular uniformly distributed light source is reflected from the back surface of the scanning mirror across a plurality of parallel photo voltaic diode structure bars which may have a gray coded aluminum mask thereon. The outputs of the diode structure bars energized through openings in the aluminum mask may energize sense amplifiers and output logic to provide a continual and accurate mirror position value.

7 Claims, 5 Drawing Figures

SCAN MIRROR POSITION DETERMINING SYSTEM

BACKGROUND OF THE INVENTION

1. Field of the Invention

This invention relates to scanning systems such as infrared scanning systems and particularly to a highly accurate mirror position sensing system.

2. Description of the Prior Art

In sensor systems such as IR (infrared) scanning and display systems in which a moving mirror is utilized to scan s scene being interrogated, the instantaneous position of the mirror is required, for example, to correct the image distortion of the scene and to enhance the picture in the processor. Conventionally, detection of the mirror position requires a highly constant scan mirror velocity, two sensors for forward and backward scanning of the mirror plus considerable electronic circuitry to respond to the sensors. Further, conventional systems typically utilize a counter to indicate the mirror position which is not totally compatible with variations of mirror speed or backward movement of mirror position. A simplified and highly accurate scanning mirror position sensor that does not require a counter to indicate position would be a substantial advantage to the art.

SUMMARY OF THE INVENTION

The scanning mirror position sensor in accordance with the invention is a subsystem consisting of a rectangular or elongated uniformly distributed light source reflecting from one surface of the scanning mirror to a sensor array. As the scan mirror rotates forward and backward horizontally, the image scans on the array which consists of a plurality of PN junction bars which are covered with a metallized pattern to block the image except in selected locations. A gray code, for example, may be formed by the metal pattern so that only a single transition change is required for each sequential number change. At the end of each P diffusion bar, a sense amplifier and a transistor logic level shifter is provided to interface directly with processing and display circuitry. Thus, whether or not the scan mirror changes its scan velocity and whether it scans backwards or forward, the mirror position is accurately monitored in the system of the invention.

It is therefore an object of this invention to provide an improved IR scanning system.

It is a further object of this invention to provide a scanning mirror position subsystem that operates in conjunction with a scene scanning mirror.

It is another object of this invention to provide a system to detect an IR scan mirror position that operates accurately and instantaneously irregardless of the scan direction or changes of scan velocity.

It is still another object of this invention to provide a scan mirror position sensor that may be constructed to provide substantially any desired accuracy of position.

BRIEF DESCRIPTION OF THE DRAWINGS

These and other objects, features and advantages of the invention itself, will become apparent to those skilled in the art in the light of the following detailed description taken in consideration with the accompanying drawings, wherein like reference numerals indicate like corresponding parts throughout the several parts wherein.

DETAILED DESCRIPTION OF THE INVENTION

Figure 1:
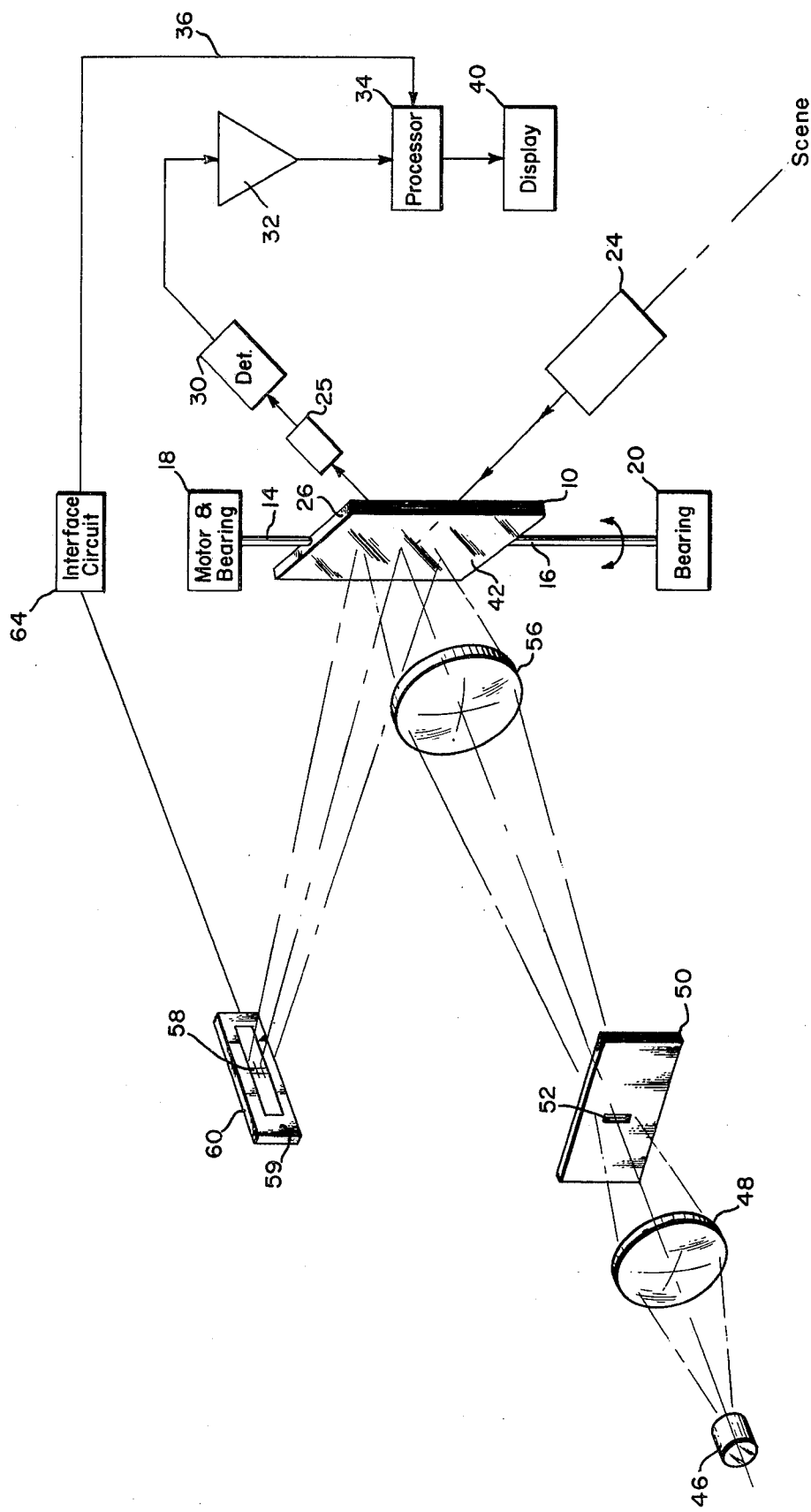
FIG. 1 is a schematic block and structural diagram showing the scan mirror position sensor in accordance with the invention.

Referring first to FIG. 1, a scan mirror 10 has scan axles 14 and 16 which are illustrated respectively coupled to a scan motor and bearing 18 and to a bearing 20. The motor 18 may, for example, rotate the mirror 10 a selected number of degrees back and forth so as to scan a scene on a front side 26 of the mirror through suitable optics 24. The reflected scene image is then applied through suitable optics 25, in some arrangements, to be detector array 30, which may include a plurality of IR detectors. The reflected scene image is then respectively applied to a preamplifier 32 and a processor 34. In order to provide image enhancement and to correct for image distortion, a composite lead 36 provides mirror position values to the processor 34 which in turn then provides imaging data to a utilization unit such as a display 40.

Although the front side 26 of the mirror 10 is utilized for thermal imaging, the back side 42 may be utilized for the position-locating system in accordance with the invention. A light source is provided which may consist of a light emitting diode (LED) 46, a suitable lense 48 and a plate 50 with a vertical slit 52 therein to direct a rectangular beam of light through a lense 56 to the back surface 42 of the mirror 10. A uniform rectangular or elongated beam of light 58 is then impinged on a metallized mask surface 59 of an array 60 and moves therealong as the mirror 10 scans back and forth. The coded outputs from the junction bars are applied to an interface circuit 64 which applies a coded position number through the composite lead 36 to the processor 34, for example. The circuit 64 may be either on the clip as shown in FIG. 2 or may be a separate structure very close thereto to reduce stray capacitance.

Figure 2:
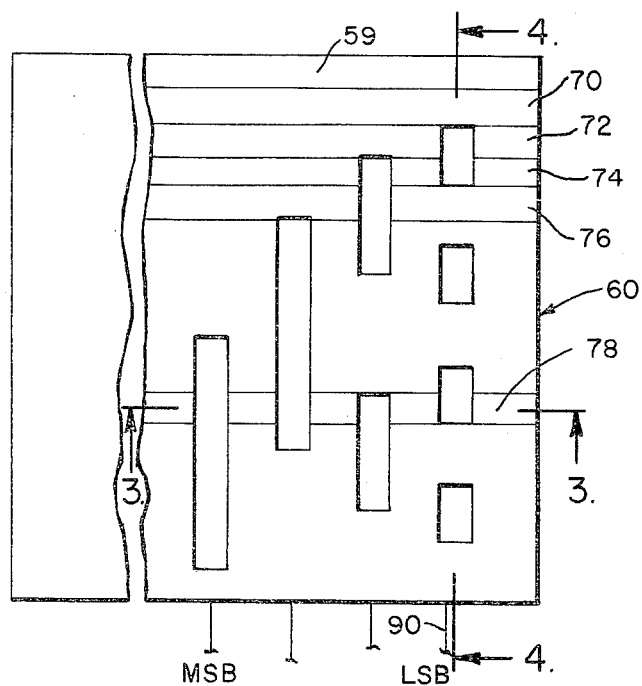
FIG. 2 is a schematic plan view of a sensor array that may be utilized in the system of FIG. 1.

Referring now to FIG. 2, top view of the gray coded multiple sensor array is shown which is illustrated as a 4-bit gray coded array over which the rectangular image scans vertically. When the rectangular image is at positions 70, 72, 74, 76 and 78, the respective gray code values of the first four counts and of a count of 1111 are developed by the photons energizing the created hole and electron pair in the depletion region of the PN junction exposed by the openings in the mask 59. As is well know in the art, the gray code count with a change of a single bit position between counts is as follows: 0000, 0001, 0011, 0010, 0110, 0111, 0101, 0100, 1100, 1101, 1111, 1110, 1010, 1011, 1001, 1000.

Figure 3:
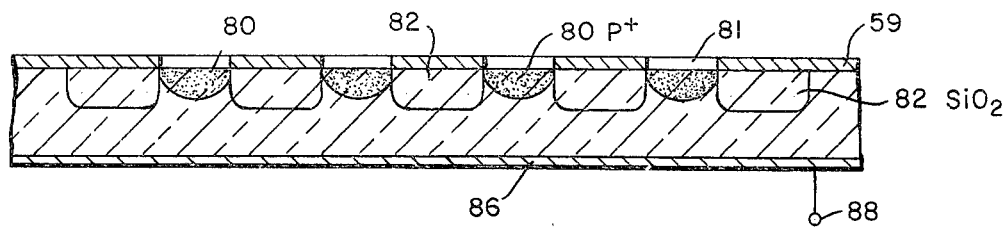
FIG. 3 is a schematic sectional view taken at line 3—3 of FIG. 2 for showing the PN junction bars utilized in the sensor array accordance with the invention.

Referring now also to the section of FIG. 3, the four $p^+$ regions such as 80 are shown each forming a PN junction bar with the N substrate 81 and each separated by a $SiO_2$ region such as 82 which serves as an insulator. A metallized plate 86 which, for example, may be aluminum is deposited on the bottom of the N substrate 81 and may be coupled to a suitable source of potential at a terminal 88 in order to maintain reverse voltage across the PN junction. The aluminum mask 59 is shown with the openings to form a 1111 output in response to photons at the position of section 3—3.

Figure 4:
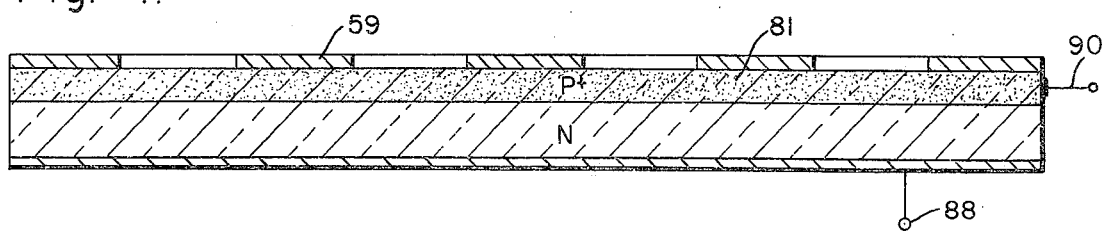
FIG. 4 is a schematic sectional view taken at line 4—4 of FIG. 2 for further illustrating a single P diffusion bar in the sensor array.
Figure 5:
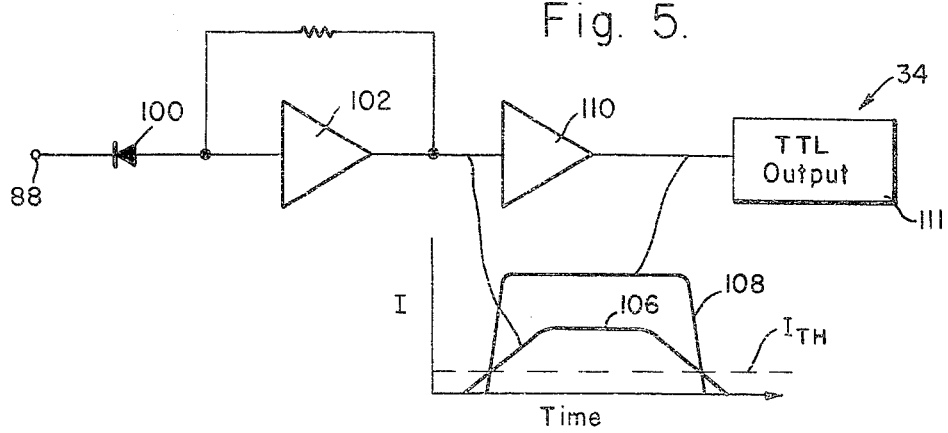
FIG. 5 is a schematic block and circuit diagram for illustrating the output circuits that may be utilized for each PN junction bar in the sensor array.

As may be seen in the section of FIG. 4, the $p^+$ diffusion region such as 81 is a bar that provides a PN junction across the width of the array at the output of the PN bar a lead such as 90 is suitably coupled to the P material to provide a current when the photo voltaic diode is energized by the rectangular light source. In the illustrated $p^+$ channel, with an N substrate, the photons cause the pair of holes and electrons in the depletion region, and electrons are collected in the $p^+$ diffusions by the electric field. Thus excess electrons are in the P material which is monitored by a sense amplifier 102 (FIG. 5). However, it is to be understood that the principles of the invention are equally applicable to an N channel and a P-type substrate in which the photons would cause an excess of holes in the N channel.

The number of PN junction bars utilized determines the accuracy of the mirror position. For example, if one thousand resolution in mirror position is desired, 10 $p^+$ silicon rectangular diffusions would be fabricated on the N substrate. The P-type of silicon is doped heavily to reduce the resistivity for conduction of generated carriers, while the N-type substrate is doped lightly to increase the sensitivity. The PN junction capacitance may be minimized to increase the response time.

The formation of the scan mirror multiple sensor array 60 may be by any standard technique such as follows:

(1) Form block of an N-type substrate and grow a layer of silicon nitrate ($Si_3N_4$) on the surface thereof.

(2) Etch away the silicon nitrate with a photo resist mask to form an area of the P channel to be exposed to light as a function of openings in the aluminum mask.

(3) Oxidize to form $SiO_2$ as an insulator between the P channel positions.

(4) Etch away the $SiN_4$ leaving the $SiO_2$ insulator channels.

(5) Diffuse or implant P material in the N substrate along the P channel positions.

(6) Deposit an aluminum mask on the P side of the substrate having a selected code such as a gray code.

(7) Deposit a metallic plate on the N side of the substrate block.

Referring now to FIG. 5, a PN junction diode 100 represents one of the PN bars which is a photo voltaic diode of the array, applying current to the sense amplifier 102. As is well known, the doping utilized in the PN junction causes the diode 100 to be responsive to photons. In order to prevent the rectangular light bar from sensing a value while only partly energizing the P material at the edge of a mask opening, the PN junction of the diode 100 has a threshold Ith which requires a current signal of a sufficient amplitude to indicate the presence of a signal. For example, a waveform 106 has a current value above Ith and a one is detected at the output of a level shifter 110. Only when the P channel in another bit position passes sufficient current as shown by the waveform 106 so as to exceed Ith, is a one signal generated by the level shifter 110. The output from the level shifter 110 may be used in the gray code form or may be transferred to a binary code before being utilized such as in the processor 34. A TTL box 111 (transistor-transistor logic) is shown to illustrate that, for example in the processor 34, logic may be utilized before being fed into the interface circuit 64 and it can be any logic such as CMOS logic or NMOS logic. Thus, whether the scan mirror changes velocity on scans forward or backward, a reliable position is provided. It is to be again noted that this position data is provided without registers or other storage requirements.

Thus, there has been described a scan mirror position sensing system that utilizes a sensor array directly responsive to the scan mirror movement. Because of the arragement of the array, the position value provided is independent of variations of the mirror such as directions, fluctuations and speed changes. The use of a gray code in the array increases the system sensitivity and reliability. However, it is to be understood that the principles and scope of the invention also include arrangements utilizing codes other than a gray code. The accurate mirror position may be applied to the processor to control the servo so as to change the mirror position such as may result from aging of the servo or may change or indicate to the display a changing of the mirror position.

What is claimed is:

1. A position determining system comprising:
   a scanning mirror having first and second sides with the first side scanning a scene to be interrogated,
   a source of a substantially rectangular shaped light beam positioned to reflect from said second side of said scanning mirror,
   a position sensor array having a selected number of elongated PN junctions and a mask with openings to said PN junctions to form position codes as said rectangular shaped light beam moves along said mask, said mask having openings along the elongated PN junctions to form a gray code with each elongated PN junction representing a bit of a predetermined significance and including a sense amplifier circuit coupled to each elongated PN junction.

2. A position sensor system comprising:
   a scanning mirror having a first surface for thermal imaging and a second surface for position sensing,
   a light source positioned to apply a rectangular light beam to the second surface of said scanning mirror,
   an array positioned to be scanned by said rectangular light beam and having photo voltaic diodes to form coded values respresentative of the position of said scanning mirror.

3. The combination of claim 2 in which said array includes a plurality of PN bars each forming a photo voltaic diode and includes a mask with openings to said PN bars to allow energization of said PN bars.

4. The combination of claim 3 further including output circuit means coupled to each PN bar to form a count representative of the mirror position.

5. A position determining system comprising:
   a repetitive scanning mirror having first and second sides, the first side of said mirror scanning a scene,
   a light beam source, said source impinging said light beam on said second side of said mirror, and
   a position sensor array formed of a plurality of photo voltaic diodes covered with a coded mask and responsive to said light beam reflected from said second side of said mirror.

6. The combination of claim 5 in which each photo voltaic diode is coupled to circuit means and said photo voltaic diodes provide threshold levels to develop position signals.

7. The combination of claim 6 further including detecting and processing means responsive to the positioning signals of said circuit means.

* * * * *